United States Patent [19]
Reinsch

[11] Patent Number: 5,398,267
[45] Date of Patent: Mar. 14, 1995

[54] PASSIVE DECAY HEAT REMOVAL AND INTERNAL DEPRESSURIZATION SYSTEM FOR NUCLEAR REACTORS

[76] Inventor: Arnold O. W. Reinsch, 13170 Carousel La., Del Mar, Calif. 92014

[21] Appl. No.: 134,620

[22] Filed: Oct. 12, 1993

[51] Int. Cl.⁶ ............................................. G21C 15/18
[52] U.S. Cl. ..................... 376/298; 376/407; 60/646
[58] Field of Search ............... 376/298, 299, 392, 407; 60/646, 657

[56] References Cited

U.S. PATENT DOCUMENTS

| | | | |
|---|---|---|---|
| 4,149,557 | 4/1979 | Keech et al. | 137/185 |
| 4,280,796 | 7/1981 | Reinsch | 376/298 |
| 4,444,246 | 4/1984 | Reinsch | 376/298 |
| 4,623,091 | 11/1986 | Stein | 137/192 |
| 4,687,626 | 8/1987 | Tong | 376/298 |
| 5,082,619 | 1/1992 | Sawyer | 376/299 |

*Primary Examiner*—Daniel D. Wasil
*Attorney, Agent, or Firm*—Brown, Martin, Haller & McClain

[57] ABSTRACT

A jet condenser injects steam from a steam generator into a mixing tube, where it combines with coolant water from a heat exchanger. The steam completely condenses Upon mixing with the water because the ratio of the mass flow rate of water to that of steam is relatively high at any given combination of temperatures and pressures. The mixture of coolant water and condensate then enters a divergent tube. This action enhances dynamic natural convection in the condenser loop, which provides the forces that move the water through the loop. A small portion of the water is returned to the steam generator; the remainder is diverted to the heat exchanger. The mass flow of the steam in the jet condenser is equal to that of the condensate returned to the steam generator, thereby maintaining a constant coolant water inventory. During an accident, radioactive fission products would be retained within the closed jet condenser loop.

18 Claims, 2 Drawing Sheets

PASSIVE DECAY HEAT REMOVAL AND INTERNAL DEPRESSURIZATION SYSTEM FOR NUCLEAR REACTORS

BACKGROUND OF THE INVENTION

The present invention relates generally to nuclear reactor safety systems and, more specifically, to such systems that operate in a passive manner to remove decay heat.

Cooling systems are of vital importance in nuclear reactors. In a pressurized water reactor (PWR), coolant water circulates through the reactor vessel containing the nuclear fuel and then through the primary side of a heat exchanger, which produces steam in a secondary loop for powering turbines. In a boiling water reactor (BWR), water in the reactor vessel is converted into steam that is used directly to drive a turbine.

In the event of an accident, the reactor may need to be shut down. To initiate shutdown, control rods are inserted into the core. However, the reactor continues to produce decay heat after the control rods have been inserted. The removal of decay heat is the essential safety function in a nuclear reactor after shutdown. If the cooling systems are damaged, the reactor may accumulate excess heat that could fail the fuel elements in the reactor vessel, leading to a release of radioactive materials. Passive cooling systems reduce the probability of fuel damage because of their high reliability and independence from electric power.

Heat removal systems, commonly known as "safety condensers" or "isolation condensers," can remove the decay heat in a passive manner. Such systems use natural convection to condense the steam in a heat exchanger. This form of convection is the same as that which creates ocean currents, weather patterns, and flames, and is commonly known as hydrostatic natural convection or aerostatic natural convection. In general, static natural convection is caused by pressure differences created by heating a fluid under the influence of gravity.

One disadvantage of the use of static natural convection for passive heat removal in nuclear reactors is that the condenser must be located at an elevation above the steam source. Thus, such systems impose serious physical design constraints that add to the cost of the reactor. Furthermore, any non-condensible gases that enter the system can accumulate in the condenser, reducing heat transfer and eventually blocking hydrostatic convection. It is known that hydrogen may enter the system when heat released during an accident causes water to react with metal, and nitrogen may enter the system when emergency coolant from nitrogen-pressurized tanks is injected into the reactor vessel in the event of a malfunction of the primary cooling system. Steam traps with float-actuated valves cannot be used to remove non-condensible gases from the current condensers because they cannot separate the gases from the steam under the transient conditions of an accident.

In the event of damage to the primary cooling loops, emergency systems may be used to add coolant, as disclosed in U.S. Pat. Nos. 4,444,246 and 4,280,796, both issued to the inventor of the present invention. The system described in the above-referenced patents is passive, i.e., it operates without mechanical pumps and emergency power supplies. When coolant water is initially added to a hot reactor vessel, the resulting eruption of steam can cause steam binding, which prevents the flow of coolant water into the vessel. The above-referenced patents describe a system for alleviating the steam binding problem by using a condenser loop to quickly remove the excess steam. The system is not designed for long-term decay heat removal. In that system, a jet pump condenses the excess steam and returns the condensate to the vessel. Such a jet pump is a well-known device that injects steam through a nozzle at sonic or supersonic velocity into water in a mixing tube. The steam condenses rapidly, and the resulting compression shock creates suction to draw additional water into the mixing area.

Because jet pumps for steam binding alleviation applications involve rapid responses to an emergency, such as adding coolant water and condensing steam, these jet pumps are designed to condense the maximum amount of steam in the shortest period of time. Thus, these jet pump designs have design parameters including steam nozzle areas that are large relative to the water intake area to provide a large amount of steam relative to water. For long-term decay heat removal, however, the same design parameters would inhibit efficient removal of heat from a loop containing a heat exchanger through which the jet pump circulates water because the loop temperature fluctuates substantially with transient changes in steam pressure and temperature during the accident. Heat removal efficiency is maximized when the temperature of the loop remains high relative to that of the heat sink in which the heat exchanger is placed. Thus, if a long-term decay heat removal system were to use such a jet pump, after prolonged heat removal the heat sink temperature would 'exceed levels at which heat removal is efficient, and the steam would cease to completely condense.

A high steam pressure head is required to power a jet pump such as that described in the above-referenced 'patents, and such pressures exist only for a short duration after emergency cooling water has been dumped into the reactor vessel. The steam-binding alleviation system described in the above-referenced patents is not designed for long-term heat removal because it is only required during refilling of the reactor vessel; refilling takes only minutes, but decay heat must be removed for hours or even days.

An economical passive heat removal system that can continue to operate efficiently throughout the range of temperatures and pressures generated in a reactor during an accident or after shutdown would be highly desirable. Such a system should be economical and retrofittable to existing reactor designs. It would also be desirable for such a system to remove non-condensible gases. These problems and deficiencies are clearly felt in the art and are solved by the present invention in the manner described below.

SUMMARY OF THE INVENTION

The present invention uses dynamic natural convection to remove heat from a steam generator with maximum reliability regardless of transient changes in temperature and pressure. The term "steam generator" is used herein to refer to the portion of a nuclear reactor that produces steam for operating a turbine, and may be the primary loop of a boiling water reactor, the secondary loop of a pressurized water reactor, or a similar structure in other types of reactors.

A jet condenser injects steam from a steam generator into a relatively narrow mixing tube, where it combines with coolant water from a heat exchanger. The steam completely condenses upon mixing with the water because the ratio of the mass flow rate of water to that of steam is relatively high at any given combination of temperature and pressure. For reasons that are discussed below, the preferred flow ratio is substantially higher than practitioners in the art have heretofore thought optimal in steam condensation systems. The mixture of coolant water and condensate then enters a divergent tube or diffusor, i.e., a tube having a gradually increasing diameter. As described below, this action enhances dynamic natural convection in the condenser loop, which provides the forces that move the water through the loop. A small portion of the' water is returned to the steam generator; the remainder is diverted to the heat exchanger. The mass flow rate of the steam in the jet condenser is equal to that of the condensate returned to the steam generator, thereby maintaining a constant coolant water inventory. During an accident, radioactive fission products would be retained within the closed condenser loop.

Unlike other passive steam condensation systems, such as the steam-binding alleviation system described in the above-referenced patents, the jet condenser of the present invention is capable of maintaining dynamic natural convection over an extended time period and over a wide range of pressure and temperature transients. The present invention is stable under transient temperature and pressure conditions because the loop, including the heat exchanger, remains at a higher temperature than the heat sink. A positive temperature differential between the loop and the heat sink can be maintained because the mass flow rate of water is large enough in relation to the mass flow rate of steam to completely condense the steam even at high water temperatures. Thus, transient changes in temperature do not cause a breakdown of the heat removal process, which consists of rejecting heat from the system to the heat sink. As noted above, the mass flow rate of the water entering the jet condenser should be a large fraction of the mass flow rate of the combined mixture passing through the mixing tube. Thus, the system can continue to remove decay heat from a reactor long after shutdown, when the temperatures would be too low for other passive heat removal systems to operate efficiently.

Since dynamic forces cannot develop under the stagnant conditions in a system that is shut down, dynamic natural convection must be initiated by a startup device. The startup device lowers the pressure of the water at the inlet end of the mixing tube relative to the pressure of the incoming steam. Although any startup device that creates a pressure differential is suitable, the startup device in the illustrative embodiment is gravity-based, momentarily inducing hydrostatic natural convection until dynamic natural convection can be maintained. The gravity-based device may comprise a conduit downstream from the mixing tube that contains a column of water. When a valve upstream from the nozzle is opened, the weight of the water column creates suction in the nozzle that causes steam to exit at high velocity.

The present invention can be designed to remove more than the decay heat from the steam generator because it operates at high steam pressures as well as low steam pressures. Thus, it can also depressurize the steam generator in a manner similar to that described in U.S. Pat. Nos. 4,444,246 and 4,280,796. When high pressure steam is present in the steam generator, a valve between the steam generator and the jet condenser may be opened to discharge the steam into the mixing tube at sonic velocity. The resulting compression shock in the mixing tube condenses the steam and imparts kinetic energy to the combined fluid.

The present invention provides significant advantages over conventional passive decay heat removal systems known as safety condensers or isolation condensers. Safety condensers operate under the principle of static natural convection, which induces motion in a fluid by adding heat to it at low elevation and removing heat from it at high elevation. The condenser, which contains thousands of gallons of water, must be located above the steam generator water level, which is itself about 50 feet above ground level. Thus, the condenser must be supported by massive structural members that are resistant to seismic damage. The massive support structures not only make safety condenser systems less economical, but also make them nearly impossible to retrofit to existing reactors, which commonly do not have space for such structures.

The present invention operates under the principle of dynamic natural convection rather than static natural convection, as in safety condensers. In an analogous way to hydrostatic natural convection, dynamic natural convection induces motion in a fluid by adding heat to it at low velocity and removing heat from it at high velocity. In the present invention, the steam developed in the steam generator at low velocity accelerates as it is discharged through the nozzle into the narrow mixing tube and increases the density of the mixture when it condenses at high velocity. The higher-density mixture then decelerates as it leaves the mixing tube and flows through the diverging conduit. Acceleration of a fluid at low density and deceleration of the fluid at high density produces the pump effect based on heat addition to the fluid at low velocity and heat removal at high velocity.

In contrast to safety condensers, the heat exchanger of the present invention can be located below the collapsed water level in the steam generator; only the jet condenser, which is relatively small and lightweight in comparison to a heat exchanger and heat sink, must be located at a high elevation. The present invention thus requires no complex and costly supporting structures and can be retrofitted to existing reactors with minimal difficulty.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF THE PREFERRED EMBODIMENT

Figures 1, 2:
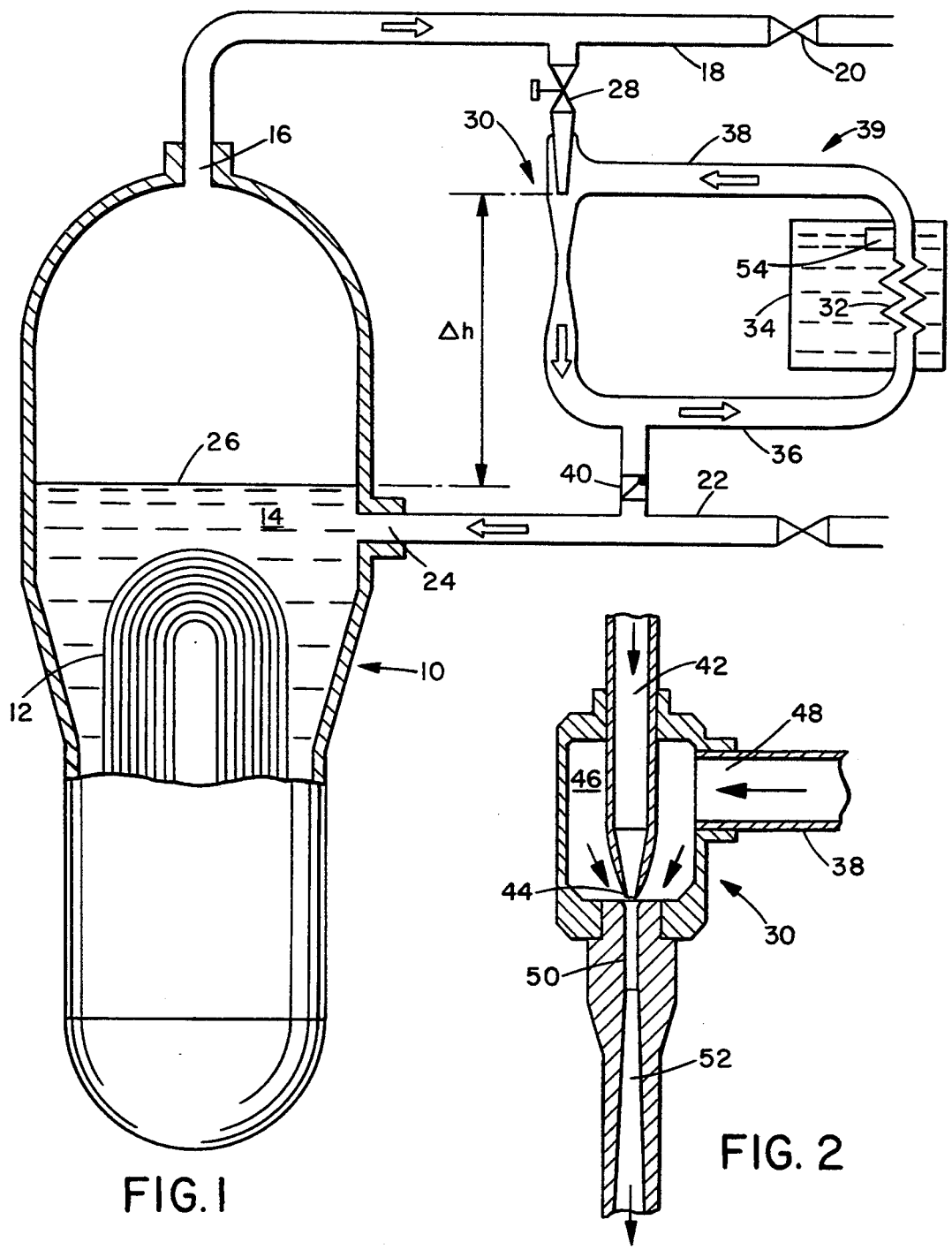
FIG. 1 is a schematic illustration of the passive decay heat removal and depressurization system.
FIG. 2 is a sectional view of a jet condenser.

In FIG. 1, a steam generator 10 has a nuclear heat source 12 with associated piping, and other structures, as known in the art. Nuclear heat source 12 generates heat and is normally immersed in coolant water 14. The heat boils coolant water 14, generating steam that exits steam generator 10 at an outlet 16, which is connected to a steam outlet pipe 18. Steam flows through pipe 18 and reaches a turbine and a condenser (not shown) via a main steam isolation valve 20. Steam is returned from the condenser as water via a water return pipe 22, which enters steam generator 10 at an inlet 24. Water 14 is constantly boiling while the reactor is operating and, as will be recognized by persons of skill in the art, the collapsed water level 26 represents the imaginary water level of the boiling two-phase mixture resulting from subtraction of the steam volume and addition of the same mass of saturated water.

The present invention comprises a valve 28 that receives steam from pipe 18, a jet condenser 30 for condensing the steam it receives via valve 28, and a heat exchanger 32 for rejecting heat to a suitable heat sink 34, such as a cooling pond. Heat exchanger 32 is connected to a heat exchanger inlet pipe 36 and a heat exchanger outlet pipe 38. Thus, pipes 36 and 38, heat exchanger 32, and a portion of jet condenser 30 form a heat exchanger loop 39. Jet condenser 30 completely condenses the steam it receives, and loop 39 thus contains only water and no steam. Although most of the water remains in loop 39 to circulate through heat exchanger 32, a small fraction of it, equal in mass to the condensed steam, returns to water return pipe 22 via a check valve 40. The mass of the water in loop 39 thus remains constant.

FIG. 2 shows jet condenser 30 in greater detail. Jet condenser 30 has a jet condenser steam inlet 42 that terminates at a nozzle 44 in the body 46 of jet condenser 30. Jet condenser 30 also has a jet condenser water inlet 48 that receives cooled water from heat exchanger outlet pipe 38. Upon opening of startup valve 28, steam flows through nozzle 44 into a narrow mixing tube 50. The length of mixing tube 50 is preferably between 10 and 12 times its diameter. A diffusor 52 at the outlet of mixing tube 50 has a diameter that increases gradually from that of mixing tube 50 to that of heat exchanger inlet pipe 36.

Two phenomena can contribute to the pressure rise that moves the water through heat exchanger loop 39. First, the steam accelerates as it is discharged through nozzle 44 into mixing tube 50 and increases the density of the mixture when it condenses at high velocity. The higher-density mixture then decelerates as it leaves mixing tube 50 and flows through diffusor 52. Acceleration of the mixture at low density and deceleration at high density produces the desired pump effect. Second, a compression shock may occur in mixing tube 50 that condenses the steam and turns the steam-water mixture into a subcooled liquid at a higher pressure than that of the mixture upstream of the shock.

Figure 3:
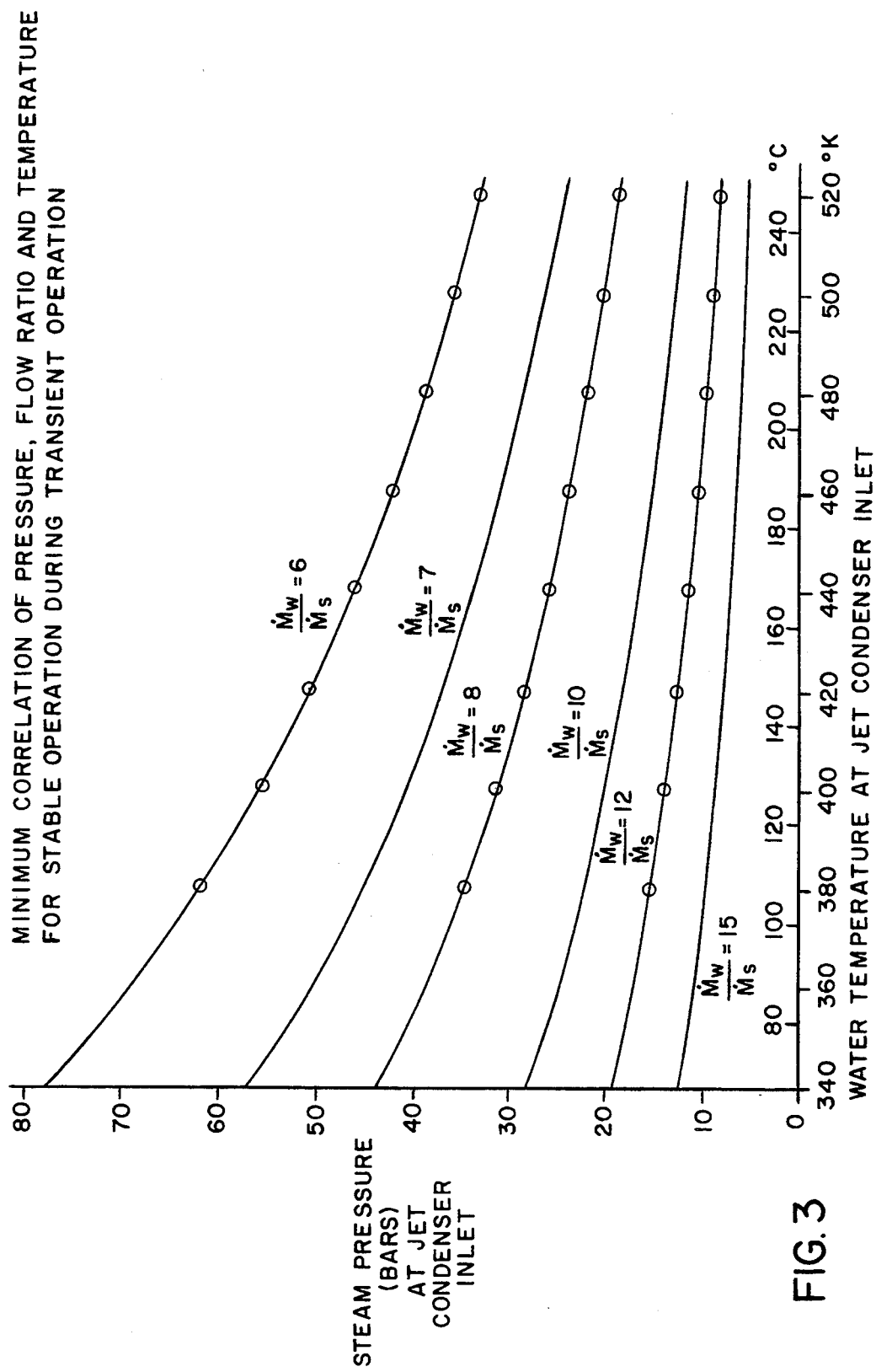
FIG. 3 is a graph showing the jet condenser design criteria.

Jet condenser 30 is designed according to a novel design criterion in order to maintain dynamic natural convection and efficient heat rejection under transient conditions of pressure and temperature. An important effect of the criterion is that, at any given time during the transient, the temperature, pressure, mass flow rate of water ($m_w$) in loop 39 and the mass flow rate of steam ($m_s$) injected into loop 39 are combined in such a way that the water in heat exchanger 32 remains at a higher temperature than heat sink 34, even after extended periods of operation when the temperature in steam generator 10 may have decreased significantly. Efficient heat transfer is the result of this positive temperature differential. The jet condenser design criterion is illustrated graphically in FIG. 3. The optimal design for jet condenser 30 for a particular reactor application depends on the temperatures and pressures expected to develop at the jet condenser inlet during the cooling period after shutdown. Each curve in FIG. 3 represents the minimum mass flow rate ratio ($\dot{m}_w/\dot{m}_s$) suitable for the combination of temperature and pressure at each point on the curve and at each point above the curve. The entire family of such curves can be expressed mathematically by the inequality:

$$\frac{\dot{m}_w}{\dot{m}_s}(T+273)\sqrt{P} \geq 18{,}000 \qquad (1)$$

where T is in units of degrees Celsius and P is in units of bars. If the criterion is less than 18,000, the assurance of reliably removing the decay heat over the necessary period of time would be compromised. It has been determined experimentally that the optimum level is approximately 30,000. A suitable jet condenser 30 can thus be designed by determining the water temperature (To) in the heat exchanger outlet pipe 38 and substituting it together with the pressure (Po) in pipe 38 for T and P in the above formula to derive a mass flow ratio. The temperature To and pressure Po represent the maximum temperatures and pressures at which the present invention will be needed to remove decay heat because, in the absence of a more catastrophic accident, temperature and pressure will decrease after the reactor is shut down as decay heat is removed. The inequality should remain true throughout the period after shutdown because the decrease in temperature (T) and pressure (P) are offset by an increase in the mass flow rate ratio, which itself varies with density, i.e., with pressure and temperature, according to well-known principles of fluid dynamics. In sum, persons skilled in the art can readily design a jet condenser 30 having the desired mass flow rate ratio at the temperature To and pressure Pc using standard fluid dynamics methods.

The present invention can thus not only remove decay heat but can also depressurize steam generator 10. If a large enough steam pressure head is present in steam generator 1 0, opening valve 28 results in operation of the present invention in a manner similar to that of the prior art steam binding alleviation system discussed above.

The present invention also includes a startup device. Opening valve 28 under stagnant conditions cannot induce water circulation in coolant loop 39. Dynamic natural convection must be initiated by other physical effects. Any startup device that lowers the pressure of the water at the downstream end of mixing tube 50 relative to the pressure at the upstream end is suitable. In FIG. 1, a preferred startup device comprises a hydrostatic or gravity-based system. In this preferred system, nozzle 44 is disposed at an elevation ($\Delta h$) above the collapsed water level 26 in steam generator 10. The value of $\Delta h$ is preferably between 0.8 and 6.0 meters. Startup valve 28 is, in turn, disposed at a higher elevation than nozzle 44. Prior to starting the present invention, the space between startup valve 28 and nozzle 44 is filled with water. Upon opening valve 28, the hydrostatic pressure difference generated by the water column of the height $\Delta h$ pushes water, followed by steam, through mixing tube 50 and into vessel 10 via check valve 40 and water return pipe 22. As described above, the mixing effect creates the pressure differential that induces flow in loop 39.

Startup is complete after several seconds during which the steam and water accelerate until they reach maximum velocities. As mentioned above, the preferred startup system is hydrostatic. However, once the water and steam reach design velocities, dynamic forces and the corresponding pressure rise generated by jet condenser 30 are almost one order of magnitude larger than the hydrostatic forces in loop 39. Although at this point most of the pumping power is generated by the thermodynamic processes of injecting steam at sonic velocity into the water in mixing tube 50, the hydrostatic pressure difference created by the weight of the water column in mixing tube 50, diffusor 52 and a portion of pipe 36 still contribute to the water circulation in loop 39. In fact, at part load, i.e., at reduced system pressure, this hydrostatic contribution gains in relative importance. Thus, the range and operational stability of the present invention are improved by the combined utilization of hydrostatic and hydrodynamic effects.

The present invention can also remove noncondensible gases from loop 39. Removal of noncondensible gases is an important advantage of the present invention. Even small amounts of noncondensible gases in heat exchanger 32 can significantly reduce heat transfer. Removal of noncondensible gases in conventional passive decay heat removal systems is hampered by the presence of steam in the condenser. A thermostatic device is commonly required to bleed off the noncondensible gases without releasing steam. In the present invention, however, a float-actuated steam trap 54 may be used to remove noncondensible gases because loop 39 contains only water and no steam. (The term steam trap is used herein because that is how the well-known apparatus is identified even though the loop 39 normally contains only non-condensible gases and not steam). Steam trap 54 may be disposed in heat exchanger 32 or at another suitable point in loop 39.

Obviously, other embodiments and modifications of the present invention will occur readily to those of ordinary skill in the art in view of this disclosure. Therefore, this invention is to be limited only by the following claims, which include all such other embodiments and modifications when viewed in conjunction with the above specification and accompanying drawings.

I claim:

1. A passive heat removal apparatus for a nuclear reactor having a steam generator, comprising:
   a heat exchanger for rejecting heat to a heat sink, said heat exchanger having a heat exchanger inlet and a heat exchanger outlet;
   a jet condenser having a jet condenser water inlet connected to said heat exchanger outlet for receiving water at a water mass flow rate ($\dot{m}_w$) and at a temperature (T), a jet condenser steam inlet connected to said steam generator for receiving steam at a steam mass flow rate ($\dot{m}_s$) and steam pressure (P), a mixing section for producing a combined fluid, and a nozzle for injecting said steam into said water in said mixing section;
   starting means for initiating dynamic natural convection in a loop formed by said heat exchanger and said jet condenser;
   said heat exchanger inlet receiving a portion of said combined fluid, and said steam generator receiving the remainder of said combined fluid; and wherein $$\frac{\dot{m}_w}{\dot{m}_s} (T + 273) \sqrt{P} \geq 18{,}000$$

where T is in units of degrees Celsius and P is in units of bars.

2. The passive heat removal apparatus described in claim 1, further comprising a steam trap disposed in said loop for removing noncondensible gases from said water.

3. The passive heat removal apparatus described in claim 2, wherein said loop has a first leg between said heat exchanger inlet and said jet condenser water inlet and a second leg between said jet condenser mixing section and said heat exchanger inlet, and said steam trap is disposed in said first leg.

4. The passive heat removal apparatus described in claim 3, wherein said steam trap is float-actuated.

5. The passive heat removal apparatus described in claim 1, wherein:
   said steam generator has a collapsed water level;
   said starting means comprises a water column having a first end at said nozzle and a second end at the same elevation as the collapsed water level; and
   said first end is at a higher elevation than said second end.

6. The passive heat removal apparatus described in claim 5, wherein said starting means further comprises a valve disposed between said steam generator and said jet condenser.

7. The passive heat removal apparatus described in claim 6, wherein said valve is disposed at a higher elevation than said nozzle.

8. The passive heat removal apparatus described in claim 7, wherein said first end is disposed between 0.8 and 6.0 meters higher than said second end.

9. The passive heat removal apparatus described in claim 7, further comprising a steam trap disposed in said loop for removing noncondensible gases from said water.

10. The passive heat removal apparatus described in claim 9, wherein said steam trap is disposed between said heat exchanger inlet and said jet condenser water inlet.

11. The passive heat removal apparatus described in claim 10, wherein said steam trap is float-actuated.

12. A passive heat removal apparatus for a nuclear reactor having a steam generator, comprising:
   a heat exchanger for rejecting heat to a heat sink, said heat exchanger having a heat exchanger inlet and a heat exchanger outlet;
   a jet condenser having a jet condenser water inlet connected to said heat exchanger outlet for receiving water at a water mass flow rate ($\dot{m}_w$) and at a temperature (T), a jet condenser steam inlet connected to said steam generator for receiving steam at a steam mass flow rate ($\dot{m}_s$) and steam pressure (P), a mixing section for producing a combined fluid, and a nozzle for injecting said steam into said water in said mixing section;
   starting means for initiating dynamic natural convection through said steam generator and a loop formed by said heat exchanger and said jet condenser, said water in a portion of said loop having a pressure equal to said steam pressure (P) prior to activation of said starting means;

said heat exchanger inlet receiving a portion of said combined fluid and said steam generator receiving the remainder of said combined fluid.

13. The passive heat removal apparatus described in claim 12, further comprising a steam trap for removing non-condensible gases.

14. The passive heat removal apparatus described in claim 13, wherein said steam trap is float-actuated.

15. The passive heat removal apparatus described in claim 12, wherein:

said steam generator has a collapsed water level;

said starting means comprises a water column having a first end at said nozzle and a second end at the same elevation as the collapsed water level; and said first end is at a higher elevation than said second end.

16. The passive heat removal apparatus described in claim 15, wherein said starting means further comprises a valve disposed between said steam generator and said jet condenser.

17. The passive heat removal apparatus described in claim 16, wherein said valve is disposed at a higher elevation than said nozzle.

18. The passive heat removal apparatus described in claim 17, wherein said first end is disposed between 0.8 and 6.0 meters higher than said second end.

* * * * *